(12) United States Patent
Cupala et al.

(10) Patent No.: US 8,792,934 B2
(45) Date of Patent: Jul. 29, 2014

(54) SELECTIVE UPDATE OF CORE MOBILE DEVICE USER INTERFACE THROUGH APPLICATION MARKETPLACE

(75) Inventors: Shiraz Cupala, Seattle, WA (US); Lan Ye, Redmond, WA (US); Neeraj Garg, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 497 days.

(21) Appl. No.: 12/859,097

(22) Filed: Aug. 18, 2010

(65) Prior Publication Data

US 2012/0046069 A1   Feb. 23, 2012

(51) Int. Cl.
*H04M 1/00*   (2006.01)

(52) U.S. Cl.
USPC ........................................ 455/550.1

(58) Field of Classification Search
CPC ............................................ H04W 88/02
USPC ..................................... 455/550.1
See application file for complete search history.

(56) References Cited

U.S. PATENT DOCUMENTS

| | | | |
|---|---|---|---|
| 7,480,907 B1 | 1/2009 | Marolia et al. | |
| 2002/0052916 A1* | 5/2002 | Kloba et al. | 709/203 |
| 2006/0026585 A1* | 2/2006 | Haselden et al. | 717/168 |
| 2006/0041572 A1* | 2/2006 | Maruyama | 707/101 |
| 2006/0106806 A1 | 5/2006 | Sperling et al. | |
| 2008/0003991 A1* | 1/2008 | Sievers et al. | 455/418 |
| 2013/0275500 A1* | 10/2013 | Hartman et al. | 709/203 |

FOREIGN PATENT DOCUMENTS

| | | |
|---|---|---|
| WO | 2005034466 A1 | 4/2005 |
| WO | 2008153416 A1 | 12/2008 |

OTHER PUBLICATIONS

"Skynax Mobile Software", Intermec Applications & Software: Management [online], Product Overview, [retrieved on Jun. 21, 2010], Retrieved from the Internet: <URL: http://www.intermec.com/products/skynax/index.aspx>.

Wikipedia, "Windows Mobile", Wikipedia, the free encyclopedia [online], Jun. 20, 1010 [retrieved on Jun. 21, 2010], Retrieved from the Internet: <URL: http://en.wikipedia.org/wiki/Windows_Mobile>.

Zeman, E. M., "Microsoft Introduces the Application Market Place", In Phone Scoop [online], Feb. 16, 2009 [retrieved on Aug. 17, 2010], Retrieved from the Internet: <URL: http://www.phonescoop.com/news/item.php?n=3972>.

Beme, P., "Windows Phone 7 Will Be Locked Down, Apple Style", In Phone Scoop [online], Mar. 15, 2010 [retrieved on Aug. 17, 2010], Retrieved from the Internet: <URL: http://www.phonescoop.com/news/item.php?n=5653>.

Zeman, E. M., "Microsoft Shares More Mobile Marketplace Details", In Phone Scoop [online], Mar. 11, 2009 [retrieved on Aug. 17, 2010], Retrieved from the Internet: <URL: http://www.phonescoop.com/news/item.php?n=4091>.

* cited by examiner

*Primary Examiner* — Chuong A Ngo
(74) *Attorney, Agent, or Firm* — Sung Kim; Andrew Sanders; Micky Minhas (57) ABSTRACT

Systems and methods for selectively updating or extending built in functionality on a mobile device are disclosed. The updates may be provided to selective portions of software such that the entire software does not need to be replaced. The update may be provided through an application marketplace that provides third party software applications for mobile devices. The software that the mobile device is shipped with may include a number of "entry points," which provide functionality that may be extended through the selective updates. When the entry point is triggered by user selection, a determination may be made whether code for the functionality is already available on the mobile device. If not, the mobile device may contact the application marketplace to determine if code is available to provide or extend the requested functionality.

16 Claims, 10 Drawing Sheets

SELECTIVE UPDATE OF CORE MOBILE DEVICE USER INTERFACE THROUGH APPLICATION MARKETPLACE

BACKGROUND

Mobile electronic devices, including portable telephone systems, such as cellular telephones, have been steadily increasing the type and variety of functionality they provide. For example, these devices may be shipped from the factory with built-in cameras, video recorders, web browsers, MP3 players, etc. From time to time, it may be necessary or beneficial to update the logic on the mobile electronic device that provides this built-in functionality.

One technique for updating the logic on mobile devices is to completely replace the mobile device's firmware. In some cases, the user must connect their mobile device to a personal computer to complete the update. Worse, the update process can be tedious and even dangerous if not performed properly. For example, previously stored information on the mobile device could be lost if the firmware update is not done correctly.

Given the complexity of and complications with the update process, the update provider may provide updates very infrequently. Moreover, since the update process is so tedious, the user may not wish to perform updates on a regular basis. Therefore, the user's mobile device may go a long time without needed or beneficial updates.

Mobile devices may be known by other names rather than cellular phones and generally refer to devices that have been integrated with receiver/transmitter technology so that they can send and receive telephone calls or other messages via a network. Mobile devices include palmtops, pocket computers, personal digital assistants, personal organizers, personal computers (PCs), and the like.

SUMMARY

Systems and associated methods for selectively updating functionality on a mobile device are provided. In some embodiments, updates are provided to selective portions of software such that the entire software does not need to be replaced. The update may be provided through an application marketplace that provides third party software applications for mobile devices. The software that the mobile device is shipped with may include a number of "entry points," which provide functionality that may be extended through the selective updates. When the entry point is triggered by user selection, a determination may be made whether code for the functionality is already on the mobile device. If not, the mobile device may contact the application marketplace to determine if code is available to provide or extend the requested functionality.

One embodiment includes a machine-implemented method comprising: receiving a user request for functionality in a user interface of a mobile device, sending a request for code that provides the functionality to an application marketplace that serves third party applications for the mobile device if the code is not available on the mobile device, installing the code on the mobile electronic device if the request for the code is granted, and performing a failover operation on the mobile electronic device if the code is not already available on the mobile device and the request for the code is not granted.

One embodiment includes a system for performing selective updates to mobile devices. The system includes one or more processors, a network interface for exchanging information over one or more networks, and one or more storage devices in communication with the network interface and the one or more processors. The one or more storage devices store updates to core user interface functionality of mobile devices. The one or more storage devices store third party applications for the mobile devices. The one or more storage devices store processor executable code. The one or more processors execute the processor executable code to receive requests for selected updates to the functionality, determine whether the selected updates may be provided based on one or more conditions, and provide the selected updates if the one or more conditions are met.

One embodiment includes a mobile device comprising one or more processors, a network interface for exchanging information over one or more networks, and one or more storage devices in communication with the network interface and the one or more processors. The one or more storage devices store processor readable code. The one or more processors execute the processor readable code to provide a user interface for selecting a plurality of functionalities associated with a plurality of entry points for launching the functionalities, receive a user selection of a first of the functionalities associated with a first of the entry points, determine whether software code is available on the mobile device for providing the first functionality, send a request to an application marketplace that serves third party applications for the mobile device if the code for providing the first functionality is not already available on the mobile device, install code for providing the first functionality on the mobile electronic device if the request is satisfied, and perform a failover operation if the code for providing the first functionality is not received from the application marketplace and if the code for providing the first functionality is not already available on the mobile device.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DETAILED DESCRIPTION

Embodiments in accordance with the disclosed technology include systems and methods for selectively updating functionality on a mobile device. In some embodiments, updates are provided to selective portions of software such that the entire software does not need to be replaced. The update may be provided through an application marketplace that provides third party software applications for mobile devices. Therefore, the third party application marketplace distribution and update model is leveraged. Included is the ability to leverage existing marketplace distribution systems for remuneration for software. In some embodiments, the software that the mobile device is shipped with includes a number of "entry points," which provide functionality that may be extended through the selective updates. An entry point may be a point in the software that is triggered when the user requests functionality associated with that entry point. When the entry point is triggered by user selection, a determination may be made whether code for the functionality is already on the mobile device. If not, the mobile device may contact the third party application marketplace to determine if code is available to provide or extend the requested functionality. This way, basic or core functionality of the mobile device may be extended after the device has been shipped without requiring that all of the software be replaced.

Figure 1:
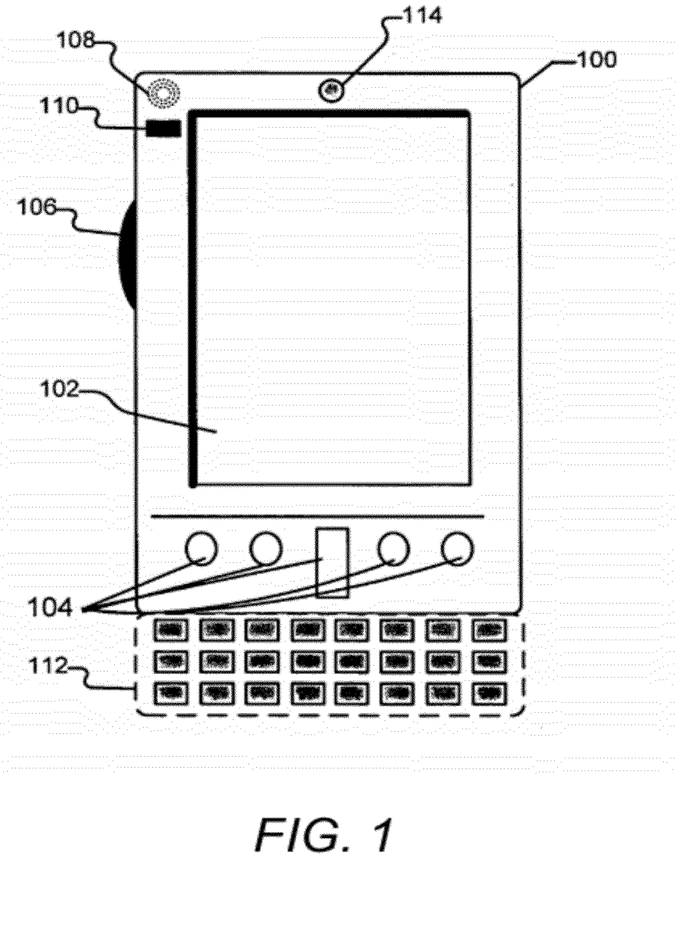
FIG. 1 is a block diagram of an example of a mobile device.

FIG. 1 depicts an example of a mobile device 100 for implementing embodiments of the disclosed technology. In this example, the mobile computing device 100 may be a cellular telephone, personal digital assistant, handheld computer, etc. The device includes touch screen display 102 and input buttons 104 to allow the user to enter information into mobile computing device 100. Mobile device 100 also incorporates a side input element 106 allowing further user input. Side input element 106 may be a rotary switch, a button, or any other type of manual input element. In alternative embodiments, mobile computing device 100 may incorporate more or less than the input elements depicted. For example, display 102 may not be a touch screen in some embodiments. In yet another embodiment, the mobile computing device is a portable phone system, such as a cellular phone having display 102 and input buttons 104. Mobile computing device 100 may also include an optional keypad 112. Optional keypad 112 may be a physical keypad or a "soft" keypad generated on the touch screen display. Yet another input device that may be integrated to mobile computing device 100 is on-board camera 114.

Mobile device 100 incorporates output elements, such as display 102, which can display a graphical user interface (GUI). Other output elements include speaker 108 and LED light 110. Additionally, mobile computing device 100 may incorporate a vibration module (not shown), which causes mobile computing device 100 to vibrate to notify the user of an event. In yet another embodiment, mobile computing device 100 may incorporate a headphone jack (not shown) for providing another means of providing output signals.

Although described herein in combination with mobile device 100, alternative embodiments can be used with any number of computer systems, such as desktop computers, other hand-held devices, laptop or notebook computer systems, multiprocessor systems, micro-processor based or programmable consumer electronics, network PCs, mini computers, main frame computers and the like. Embodiments may also be practiced in distributed computing environments where tasks are performed by remote processing devices that are linked through a communications network in a distributed computing environment, with programs located in both local and remote memory storage devices.

Figure 2:
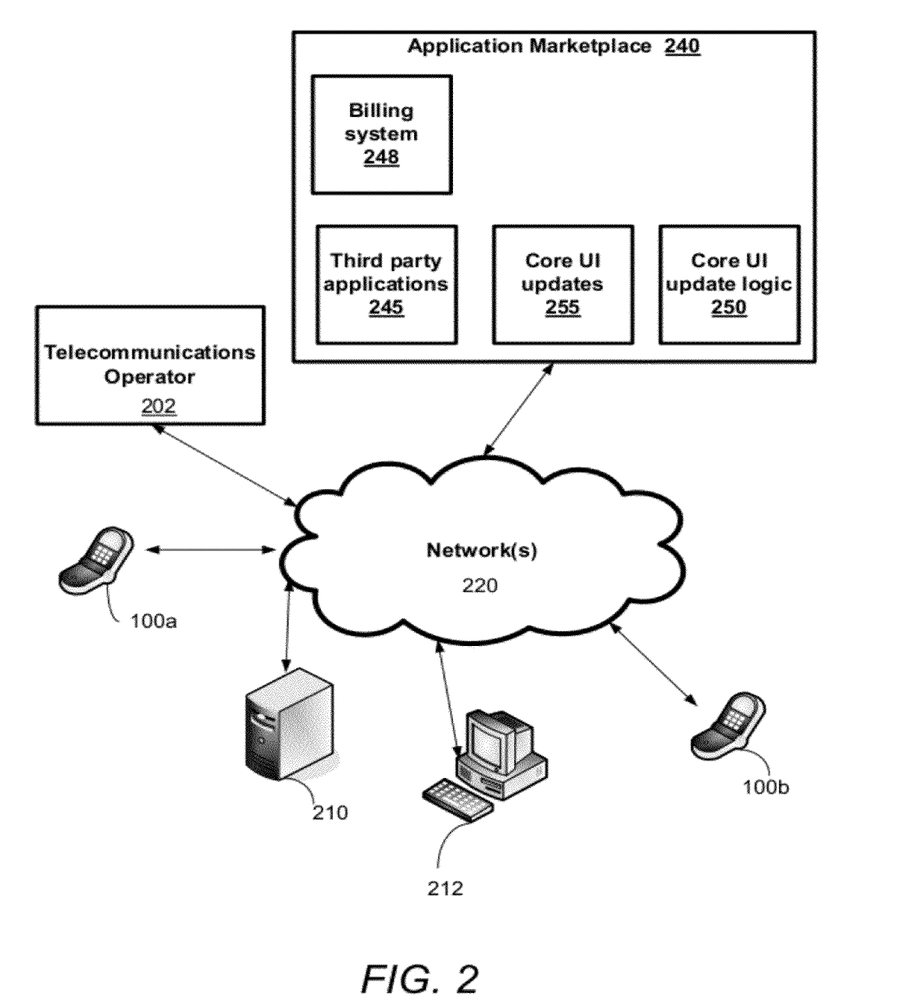
FIG. 2 is a block diagram of a networked computing environment in which embodiments may be practiced.

FIG. 2 depicts a system in which one or more embodiments of the disclosed technology may be implemented. Mobile computing devices 100a may operate in a networked environment to transmit to and receive data from other computing devices such as server 210, application marketplace 240, desktop computer 212, and mobile device 100b. Other computing devices may participate in this networked system as well. The computing devices participating in the networked environment may communicate over one or more network(s) 220. The network(s) 220 may include a secure network such as an enterprise network, or an unsecure network such as a wireless open network. By way of example and not limitation, the network(s) may include local area networks (LANs), wide area networks (WAN), the Internet, wired transmission media such as a wired network or direct-wired connection, and wireless transmission media such as acoustic, RF, infrared and other wireless media.

A telecommunications operator 202 is depicted which may provide services to both fixed and mobile devices. Operator systems such as 202 can provide access to networks 220 through operator mobile and IP networks, for example. Such systems may include an interface network (IN) server, an OMA server, and a cloud server such as a WINDOWS LIVE (WL) server. An application marketplace 240 is depicted, which has logic to help update core user interface functionality on a mobile device 100, as described hereinafter.

The operator and service providers can utilize existing mobile core network and back office systems to lay the foundation for next generation Internet protocol multimedia subsystems (IMS) architectures, etc. A service provider system is typically installed as part of a telecommunication operator's core network and operates with various components in the carrier network. Telecommunications operator 202 and application marketplace 240 may support different application interfaces allowing networked communications within telecommunication operator's various networks. The telecommunication operator networks include, but are not limited to, a 3G/GSM network, internet protocol network and a cloud services layer, etc. Users may communicate with each other in many ways, such as, but not limited to, through an operator's 3G network (by initiating or receiving a call on mobile devices 100, for example), through an operator's IP network (by initiating/receiving a call on mobile device 100 or personal computer 212).

Application marketplace 240 is a service that allows users to browse and download third party software applications 245 for the mobile device 100. By third party software applications 245 it is meant that the software applications 245 have been developed by entities other than the entity that provided the operating system of the mobile device 100. By allowing third parties to develop software applications that will work with the operating system of the mobile device 100, the user is allowed to add applications that might not otherwise be available. For example, the user might see a third party application that helps them to track how many calories they consume each day. This software application is able to run on the operating system; however, it may be considered to be an add-in to the software already on the mobile device 100. For example, after downloading the third party software application it might be listed as a separate application that the user can launch by itself.

The user might be charged some amount of money for the third party applications 245. The billing system 248 is able to handle aspects such as informing the user as to the purchase price, collecting transaction information from the user to facilitate the purchase, credit the appropriate third party when one of their software applications is purchased, etc. The billing system 248 may cooperate with other systems (not depicted in FIG. 2) to complete the purchase transaction. For example, the billing system 248 might communicate with a server that authorizes credit card information.

The application marketplace 240 may also serve the purpose of selectively updating core user interface functionality. These updates may extend the functionality of primary experiences that are already built-in to the mobile device 100. For example, when the mobile device 100 was manufactured it had certain built-in or core functionality. This built-in or core functionality may be selectively updated through the application marketplace 240, such that an update of the entire mobile device 100 is not necessary. Moreover, because the selective update process may take place through the application marketplace 240, the update process may leverage aspects of the application marketplace 240 such as the billing system 248.

The application marketplace 240 has core UI update logic 250 and core UI updates 255. The core UI updates 255 include a collection of software updates that are available for mobile devices 100. Each update may be a piece of software code that may provide a certain functionality to the mobile device 100. This piece of code may be any unit of software, such as one or more modules, functions, applications, or any combination thereof. In some embodiments, the piece of code will not appear as a separately executable application on the mobile device 100. For example, after the update, the user might not see a new application that can be selected for running. However, an existing application on the mobile device 100 may receive additional functionality.

The core UI update logic 250 is able to interface with the mobile devices 100 to receive requests for core UI updates 255, determine whether those updates are available in the core UI updates 255, and provide those updates to the requesting mobile device 100. The core UI update logic 250 may interface with the billing system 248 if there is a charge to the user for the update. The core UI update logic 250 may be implemented by software code. In other words, the core UI update logic 250 may be implemented by accessing stored computer executable instructions and executing them on a computer processor. Example computer systems are discussed below.

In some embodiments, the user may be asked if they desire to purchase the added functionality provided by a core UI update 255. This allows the billing system 248 of the application marketplace 240 to be leveraged. For example, the already existing billing system 248 may be used to facilitate user purchases. Also, the user may already be familiar with the application marketplace 240 from visiting the marketplace 240 for third party applications 245. Therefore, the user may benefit from a familiar user experience.

The server 210 may provide web pages that, in some cases, provide core UI functionality. For example, the mobile device 100 may contact the server 210 for certain functionality as a failsafe in the event it is unable to obtain the desired core UI update 255 from the marketplace 240.

Figure 3:
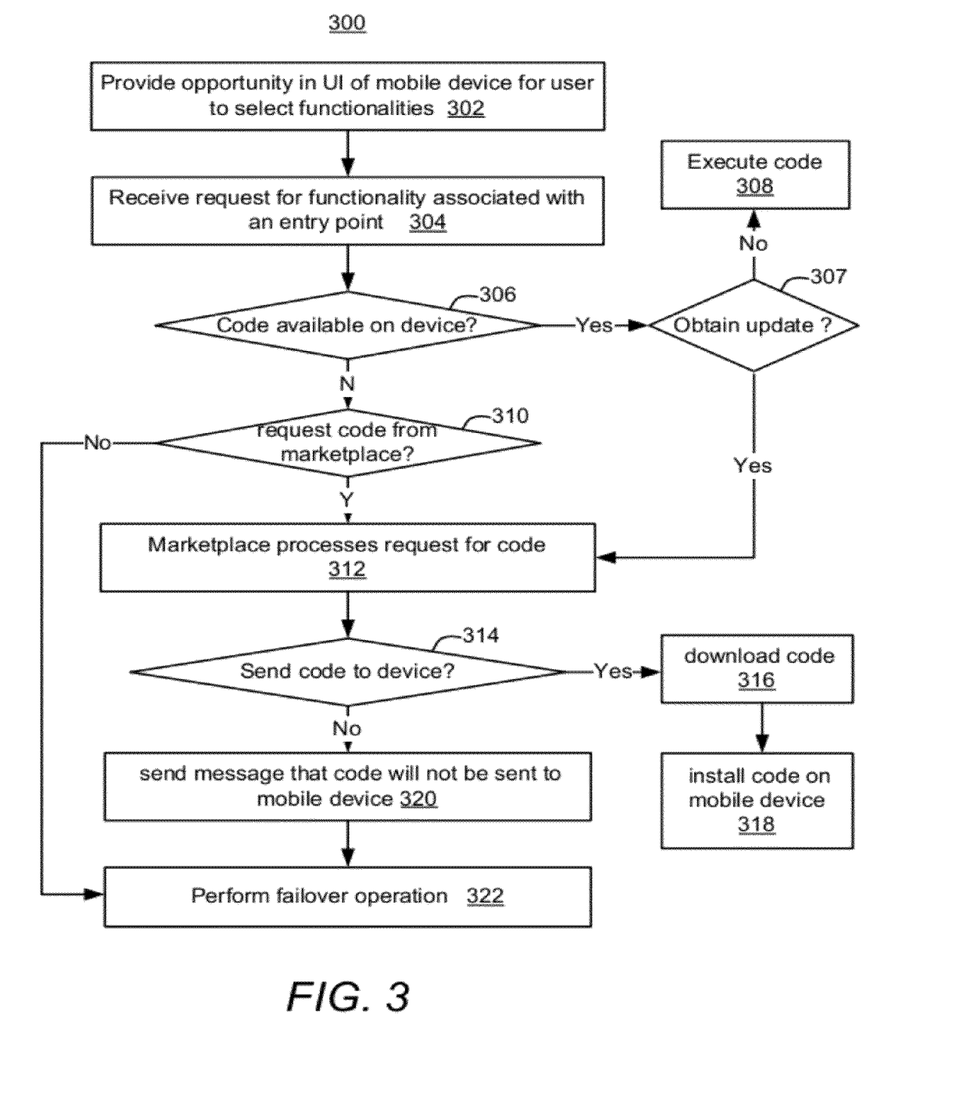
FIG. 3 is a flowchart of one embodiment of a process of selectively updating core UI functionality on a mobile device.

FIG. 3 is a flowchart of one embodiment of a process 300 of selectively updating core UI functionality on a mobile device 100. Reference will be made to the system of FIG. 2 when discussing process 300. Prior to process 300 the user might request that a main application on the mobile device 100 execute. For example, the user might start up an application that allows game play. For the sake of illustration, this main application has a user avatar associated with it. An avatar is a representation of the user that be used during game play, messaging, etc.

In step 302, the mobile device 100 provides a user interface for the user to select one or more functionalities For example, an menu or icon might be displayed on the display screen 102 of the mobile device 100, which when selected allows the user to customize their avatar. Thus, customizing an avatar is one example of a functionality. Other examples of functionalities include modifying a friends list, modifying a user profile, and character generation. Note that the user is not necessarily presented the opportunity to select all possible functionalities at any time. For example, the user might only be provided the opportunity to customize their avatar when the user selects a certain portion of the main application. For example, there might be a user preferences option which, when selected, provides the user with the opportunity to select from among several different functionalities.

In step 304, the mobile device 100 receives a user request for some functionality in a user interface of the mobile device 100. For example, the user selects an icon or menu item in order to customize their avatar. In some embodiments, the functionality is associated with an entry point that serves as a launching point for that functionality. The mobile device 100 may have been provided to the user with entry points installed in the software, each of which serves as a launching point for some user interface functionality. However, the full functionality might not be provided when the user first receives the mobile device 100. In other words, when the user selects the functionality associated with the entry point, the mobile device 100 may not have all of the code for providing the functionality associated with that entry point. In one embodiment, a user selects a link or icon on a display screen of the mobile device 100 to select the functionality and trigger the entry point.

In step 306, the mobile device 100 determines whether software code associated with the selected functionality is already available on the mobile device 100. In some cases, the code is not available because it is not presently installed. In some cases, the code may be installed, but cannot be run for some reason. For example, the user may have had a trial period to run the code and the trial period has expired. This code could be code that was previously downloaded from the application marketplace 240 and installed on the mobile device 100. In some embodiments, the mobile device 100 determines whether to obtain an update to the code in step 307, prior to launching the code. If there are updates (and possibly if the user wants to obtain the update), the mobile device may send a request for the update to the application marketplace 240. Then, the process may continue at step 312 in which the application marketplace 240 processes the request. Step 312 is discussed in more detail below in the discussion of process 300. Obtaining updates is discussed in more detail in connection with FIG. 8.

If there is code already available for the selected functionality (and no update is to be obtained), then the code may be automatically executed in step 308. In some embodiments, there is no need to launch a separate application to provide the selected functionality.

If the code is not already available (step 306), then the mobile device 100 determines whether it should request the code from the marketplace 240 in step 310. In one embodiment, the mobile device automatically attempts to obtain the code from the application marketplace 240 without any input from the user. Therefore, the experience is seamless for the user. Further details of one embodiment of step 310 are discussed below. If the mobile device 100 determines that it should not request the code, then the mobile device performs a failover operation in step 322. Numerous failover operations are possible including, but not limited to, displaying a message to the user that the code is unavailable, launching a web page that has similar functionality instead, and launching native code on the mobile device 100 as a substitute. Performing a failover operation is discussed in more detail with respect to FIG. 7.

If the mobile device 100 determines that it should request the code from the marketplace 240, then the mobile device 100 sends a request to the application marketplace 240. The application marketplace 240 processes the request in step 312. In step 312, the application marketplace 240 may determine whether the code is available in the application marketplace 240. In some embodiments, the user is asked whether they wish to purchase the code. In some embodiments, the code is downloaded without any fee to the user. In step 314, the application marketplace 240 determines whether the code should be provided to the mobile device 100. Further details of step 312 and 314 are discussed below in connection with FIG. 6.

If the code is to be provided to the mobile device 100, then the code is downloaded to the mobile device 100, in step 316. After the code is downloaded, it is installed on the mobile device 100, in step 318. In some embodiments, installing the code results in an update to an already existing piece of software on the mobile device 100. However, note that the user does not necessarily see a new application on their device 100 as a result of the update. In other words, the update might not result in a separately executable application being added to the mobile device 100.

At some point after installing the code, the code may be executed in step 308. In some embodiments, the application that the user was running when selecting the functionality is shut down before, during, or after the update process. Then, when the user runs the application again and selects the functionality, the code may automatically execute. For example, process 300 starts again at step 304 when the user once again selects the functionality. However, this time the mobile device 100 determines that the code is already installed at step 306, and executes the code at step 308.

As noted, it may be that the application marketplace 240 determines that the code is not to be provided to the mobile device 100. For example, it might be unavailable at the application marketplace 240 or the user might opt to not pay for the code in the event there is a fee. In this case, application marketplace 240 sends a message to the mobile device 100, in step 320, rather than sending the code.

In step 322, the mobile device 100 performs a failover operation. Numerous failover operations are possible, including but not limited to, displaying a message to the user that the code is unavailable, launching a web page that has similar functionality instead, and launching native code on the mobile device 100 as a substitute.

As mentioned, software on the mobile device 100 may have entry points that may launch functionality associated with that entry point. Thus, an entry point is a point in software code that serves as launching point (or entry point) for some functionality. There may be many entry points in the software code, each of which may be associated with a different functionality. For example, one entry point may be associated with customizing an avatar.

Figure 4A:
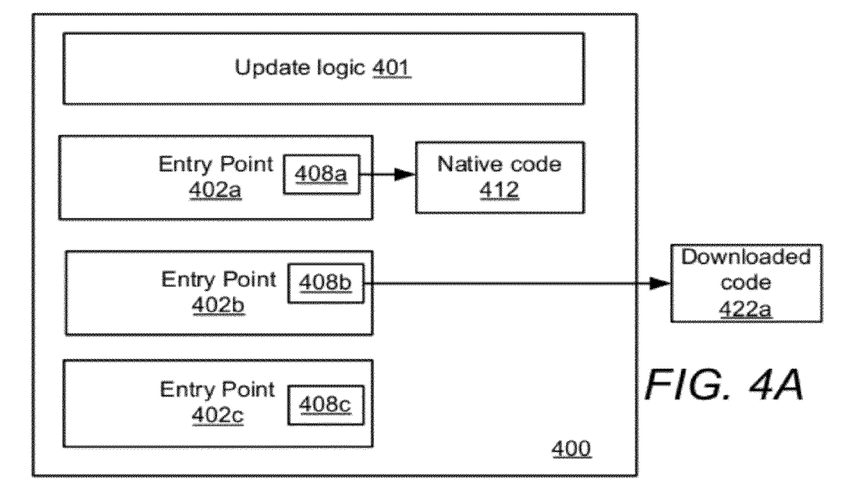
FIGS. 4A, 4B and 4C depict representations of software code on the mobile device.
Figure 4B:
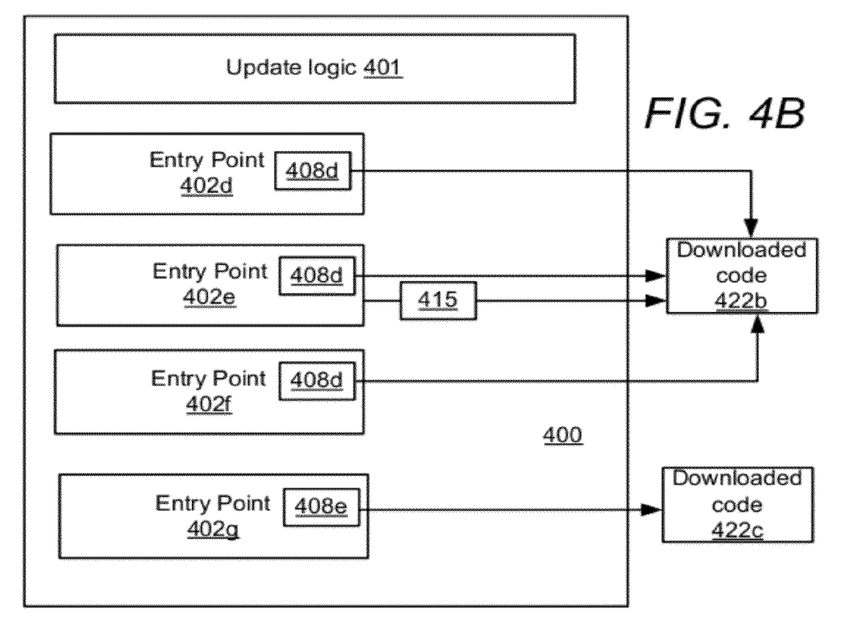
Figure 4C:
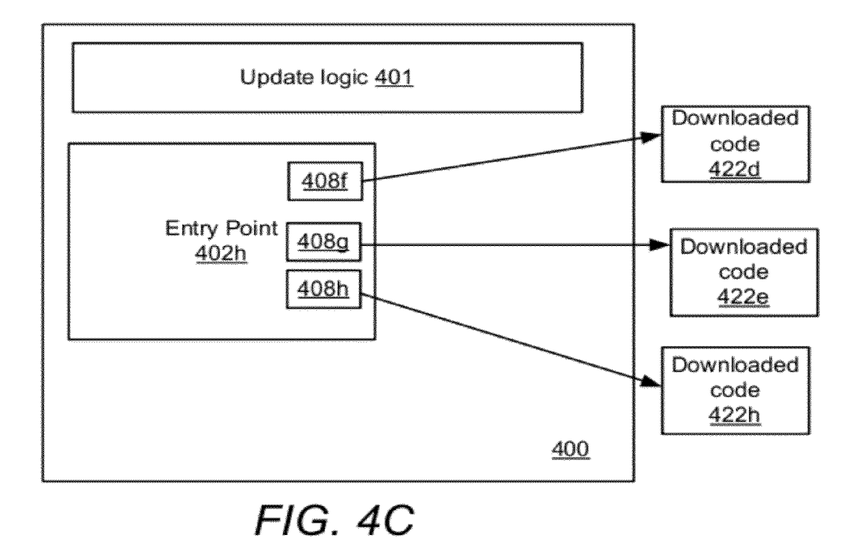

FIGS. 4A, 4B and 4C depict representations of software code 400 on the mobile device 100. The software code 400 may include one or more software applications, modules, functions, procedures, etc. The software code 400 may have been included on the mobile device 100 when it was first provided to the user. In some embodiments, the software code 400 provides a user interface. This user interface may allow the user to input requests for specified functionalities, such as customizing avatars, etc. The software code 400 includes update logic 401, entry points 402, and native code 412. The native code 412 may be associated with an entry point 402 and may able to perform one of the functionalities that the user might request. FIG. 4A also depicts downloaded code 422, which may be associated with one or more of the entry points 402 and may be able to perform the functionality associated with that entry point. The various software code represented in FIG. 4A may include stored instructions, which are executable on a processor.

The update logic 401 is able to control portions of the selective update process. For example, the update logic 401 may perform steps 302-310 and 322 of FIG. 3. The update logic 401 may be included on the mobile device 100 when it was first provided to the user.

There may be any number of entry points 402, but typically there would be more than one entry point 402. These entry points 402 may be included on the mobile device 100 when it was first provided to the user. In some embodiments, an entry point 402 includes an identifier 408. For example, entry points 402a-c have identifiers 408a-c, respectively. The identifier 408 could specifically identify the software code that can be downloaded to provide the functionality associated with the entry point 402. However, it is not required that the identifier 408 specifically identify a piece of software code. The identifiers may have be hard coded or updated dynamically. In one embodiment, the identifier is added to the mobile device 100 prior to providing the device to the user.

In some cases, the software code for providing the functionality associated with an entry point 402 may already be installed on the mobile device 100. For example, for entry point 402a, native code 412 is already installed on the mobile device 100. Note that native code 412 may have been included on the mobile device 100 when the device was provided to the user. However, presently there is no downloaded application from the application marketplace 240 for entry point 402a. Therefore, the native code 412 may be used during a failover operation (e.g., step 322, FIG. 3) to provide some functionality for the entry point 402a. For entry point 402b, the mobile device 100 already has downloaded code 422a from the application marketplace 240. However, for entry point 402c, there is no native code 412 and no already existing code from the application marketplace 240.

In some embodiments, the identifier 408 is uniquely associated with that entry point, but is not necessarily associated with a specific piece of code. Therefore, over time the piece of code for the entry point 402 may change. For example, the application marketplace 240 could provide some other functionality for a given entry point. In some cases, an entry point 402 may be the only entry point 402 associated with certain code. For example, entry point 402b might be the only entry point associated with downloaded code 422a.

In other cases, multiple entry points 402 may be associated with the same code (whether downloaded or native). Referring to FIG. 4B, entry points 402d, 402e, and 402f are each be associated with downloaded code 422b. On the other hand, entry point 402g is associated with downloaded code 422c. As examples, entry point 402d might be for launching functionality of character generation, entry point 402e might be for launching functionality of friends list, and entry point 402f might be for launching functionality of profile generation. Any number of entry points 402 may be associated with the same piece of code. In this example, entry points 402d-f have the same identifier 408d, but they could each have their own identifier. Entry point 402g is shown with identifier 408e.

In some embodiments, an entry point 402 sends parameters to the code that provides the functionality. For example, entry point 402e may send parameter 415 to downloaded code 422b. As stated above, multiple entry points 402 may be associated with the same code. In this case, the code may be launched in response to user selection of one of the entry points 402. The selected entry point 402 may send one or more parameters to the code, which among other things can indicate which entry point the user selected. Note the even if only one entry point 402 is associated with the code, the entry point 402 may send one or more parameters to the code.

FIG. 4C shows another embodiment in which one entry point 402h is associated with several different pieces of downloaded code 422d, 422e, 422h. In this example, the entry point has three identifiers 408f, 408g and 408h that may be passed to the application marketplace to help identify the code that is to be downloaded. Each piece of code 42d, 422e, 422h may provide a different functionality, but that is not required.

Figure 5:
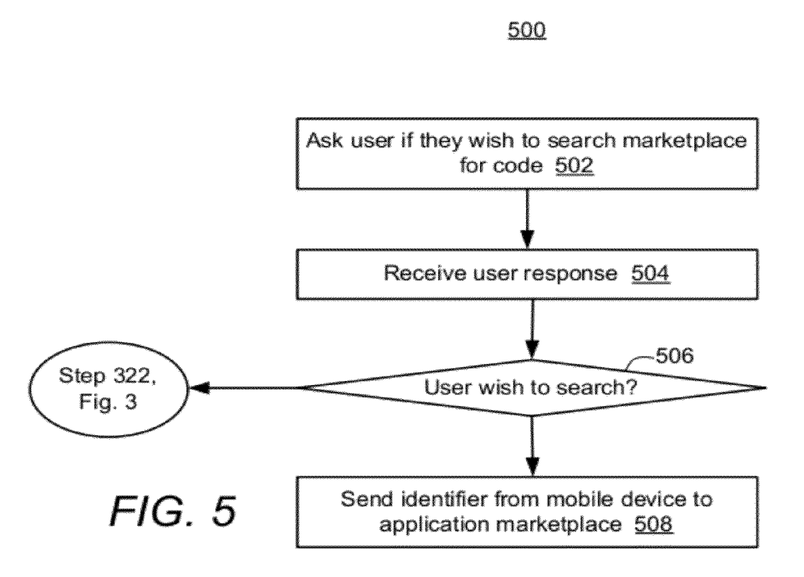
FIG. 5 is a flowchart of one embodiment of a process of determining whether code for the requested functionality should be requested from the application marketplace.

FIG. 5 is a flowchart of one embodiment of a process 500 of determining whether code for the requested functionality should be requested from the application marketplace 240 if it is determined that the code is not available on the mobile device 100. Thus, process 500 may be one embodiment of step 310 of process 300. In step 502, the user is asked whether they wish to search the application marketplace 240 for the code for performing the selected functionality. For example, a message is presented on the display screen 102 of the mobile device 100. Note that this message may be displayed within the application that is to provide the functionality. In step 504, the user's response to the query is received. For example, the user taps selects either a yes or no icon on the mobile device's display screen 102. Note that as stated above, in some embodiments, the mobile device 100 attempts to obtain the code without asking the user.

If the user wishes to search (step 506), then the mobile device 100 sends an identifier 408 to the application marketplace 240 in step 608. As mentioned in the discussion of FIGS. 4A-4C, each entry point 402 may have an identifier 408 linked or associated with it. The identifier 408 might be uniquely associated with the entry point 402 or it might be uniquely associated with the code for providing the selected functionality. For example, it is possible that two different entry points 402 have the same identifier 408. After step 508, the mobile device 100 waits for a response from the application marketplace 240. If the user does not wish to search for the code (step 506), then the mobile device 100 may perform a failover operation (step 322, process 300).

Figure 6:
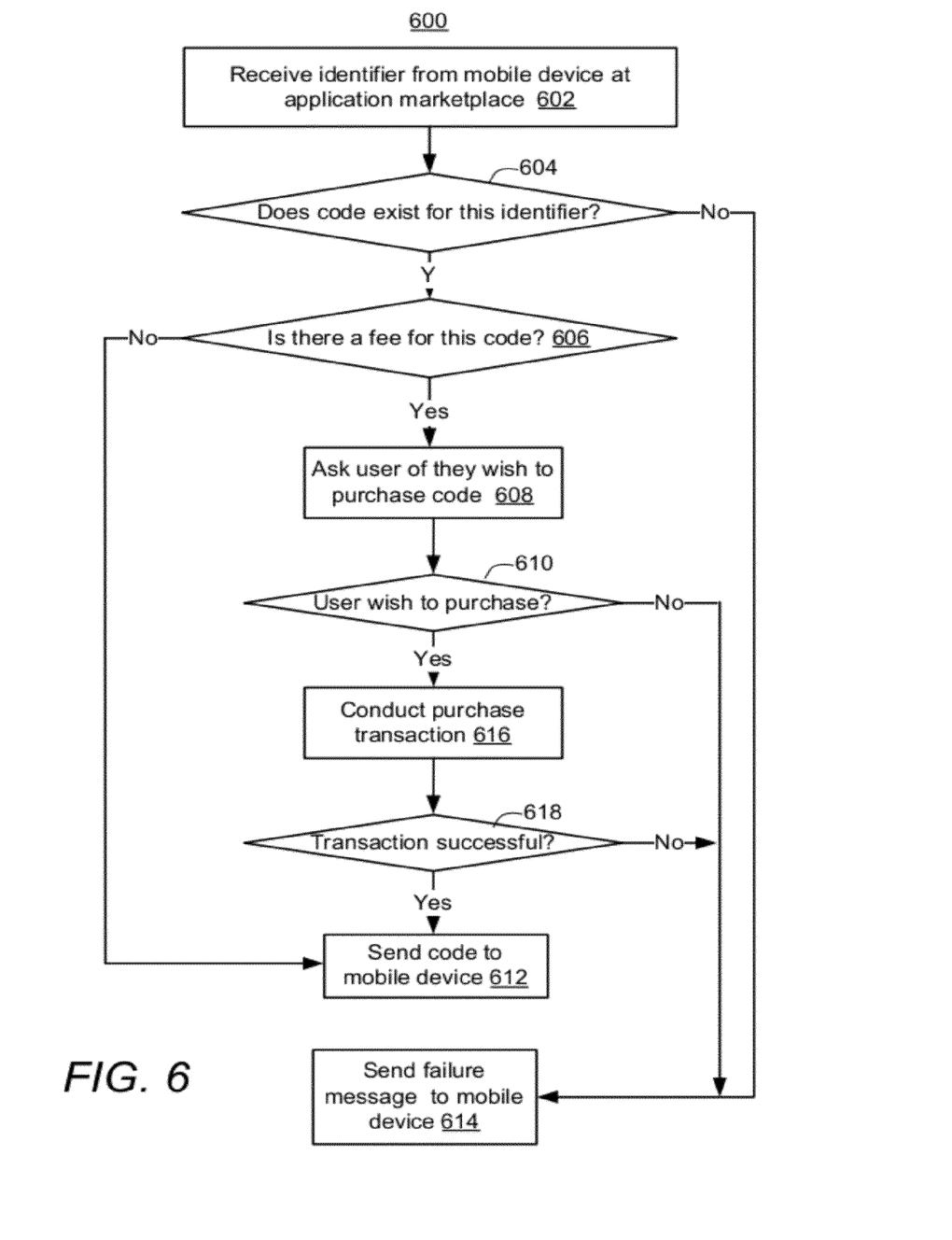
FIG. 6 is a flowchart of one embodiment of a process of the application marketplace responding to a request for code for certain functionality.

FIG. 6 is a flowchart of one embodiment of a process 600 of the application marketplace 240 responding to a request for code for certain functionality. Thus, process 600 may occur in response to the mobile device 100 sending the identifier (step 508, process 600). Process 600 may be one embodiment of steps 312, 314, 316, and 320 of FIG. 3. In step 602 of FIG. 6, the application marketplace 240 receives the identifier 408 from the mobile device 100. As mentioned, this identifier 408 may be associated with the selected functionality. Note that there could be more than one identifier 408 per entry point 402 (see FIG. 4C, for example), in which case various steps of process 600 can be repeated for each identifier 408.

In step 604, the core UI update logic 250 determines whether the code for the requested functionality is available in the core UI updates 255. In some embodiments, each update 255 has its own identifier associated with it. In this case, the core UI update logic 250 may determine whether there is an update 255 that corresponds to the received identifier 408 (note that the two identifiers are not required to have the same value). In some cases, the same update 255 should be sent in response to different entry points 402 being selected by the user. One way to handle this is to have different entry points 402 use the same identifier 408, as depicted in FIG. 4B. Another way to handle this is to associated multiple identifiers with a certain update 255. Other techniques could be used.

In some embodiments, the application marketplace 240 has a table that is used to map the received identifier 408 to an update 255. Note that this table could be changed over time to alter which code is sent to the mobile device 100. For example, at one point in time identifier 408a may be linked to one piece of code in the updates 255 and at another point in time identifier 408a may be linked to a different piece of code in the updates 255. This may allow different versions of the code to be provided. It may also allow different functionalities to be provided for the same entry point 402. In this later case, there may have been some changes to the code on the mobile device 100 to indicate this new functionality for the entry point.

If the code does not exist in the updates 255, then a failure message may be sent to the mobile device in step 614. If the code does exist, then the core update logic 250 determines whether there is a fee for the code in step 606. In one embodiment, the core update logic 205 interfaces with the billing system 248 to determine whether there is a fee for the code. If there is not a fee, then the code is sent to the mobile device 100 in step 612.

If there is a fee, then the user is asked whether they wish to pay the fee in step 608. For example, a message sent to the mobile device 100 asking whether the user wishes to pay the fee. The user may be informed that if they do not wish to pay the fee that limited functionality may be available through various failover options. Therefore, the user could test out the failover options prior to making the purchase. If the user decides that they do not want to pay the fee, then an appropriate message may be sent to the user in step 614.

If the user decides to purchase the update 255, then a purchase transaction is performed in step 616. The purchase transaction may leverage the existing billing system 248. If the purchase transaction is successful, then the code is sent to the user in step 612. Otherwise an appropriate failure message is sent to the mobile device 100 in step 614.

Note that variations of process 600 are possible. In some embodiments, to code that is sent to the user may be based on some property of the user, such as their subscription level. For example, one user may have a "gold" subscription level and another a "silver" subscription level. A given entry point 402 (or identifier 408) could potentially have two versions of the code (referred to as "gold" and "silver"). The gold version may be sent to the gold user and the silver version may be sent to the silver user, if available. If the gold version is not presently available, the silver version may be sent to the gold user. If the silver version is not presently available, the gold version might be sent to the silver user, or failure message code be sent to the mobile device 100 indicating the code is presently unavailable.

Figure 7:
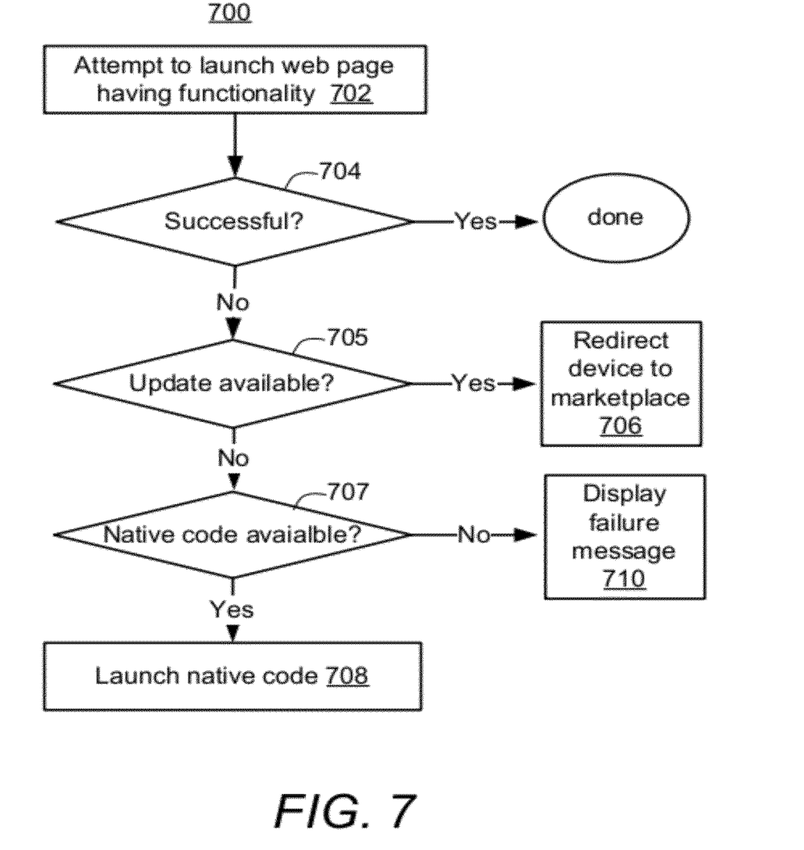
FIG. 7 is a flowchart of one embodiment of a process of performing a failover operation.

FIG. 7 is a flowchart of one embodiment of a process 700 of performing a failover operation. Process 700 may be performed when the code for the requested functionality is not already installed on the mobile device 100 and the code was not obtained from the application marketplace 240. Process 700 is one embodiment of step 322 of FIG. 3.

In step 702, an attempt is made to launch a web page that provides the functionality. In one embodiment, the mobile device 100 contacts a server 210 that provides a version of the functionality. It may be that delivering the full functionality through the web page is difficult. Therefore, the functionality provided by the server 210 may be a lightweight version of the functionality.

If the attempt to provide the functionality through the web page was successful (step 704), then the process ends. However, if the attempt was not successful, then web page (or server hosting web page) may determine whether code to provide the functionality is available at the application marketplace 240, in step 705. If so, the web page redirects the mobile device 100 to the application marketplace 240, in step 706, such that the user may download the code (possibly via purchase). If the web page determines that the code is not available at the application marketplace 240, then the mobile device 100 may determine whether there is native code 412 on the mobile device that is able to provide some version of the functionality, in step 707. Referring to FIG. 4A, there is native code 412 for the functionality for entry point 402a. However, there might not be native code 412 for other entry points 402. By native code it is meant code that was included on the mobile device 100 when it was provided to the user. Thus, the native code 412 does not include code that was downloaded from the application marketplace 240. If the native code 412 is available, it is launched in step 708. Otherwise, a message is displayed in step 710 that currently no code exists for providing the selected functionality.

Note that the process 700 is one example of providing a failover operation and that many variations are possible. For example, the order in which operations are selected may be switched. As one example, a search for native code 412 on the mobile device 100 could be made prior to attempting to launch a web page. Another variation is to ask the user whether the user desires to launch the web page and/or the native code prior to making such attempts. In one embodiment, the mobile device 100 attempts to obtain the code at some later point in time in the event that the code is not available at the application marketplace 240 when the user requests the functionality.

Figure 8:
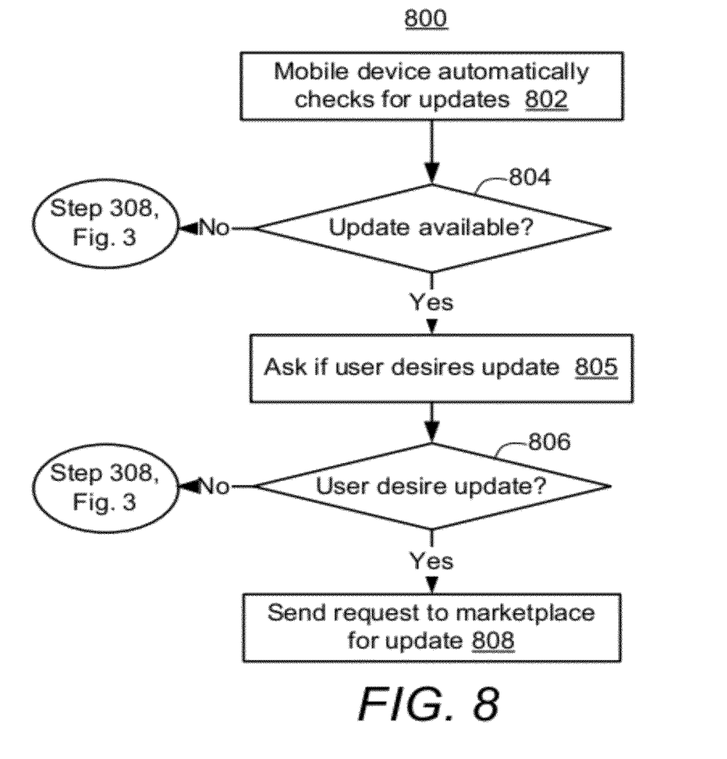
FIG. 8 is a flowchart of one embodiment of a process determining whether to obtain an update.

FIG. 8 is a flowchart of one embodiment of a process 800 determining whether to obtain an update. The process 800 may be performed in response to a user selecting an entry point 402. Referring to FIG. 3, process 800 is one embodiment of the step 307. Recall that step 307 occurs after the mobile device 100 has determined that there is a version of the code that provides the selected functionality already installed on the mobile device 100.

In step 802, the mobile device 100 contacts the application marketplace 240 to determine whether there is an update available for the code that provides the selected functionality. If there is not an update available, then the already installed code may be executed (step 308, FIG. 3).

If there is an update available (step 804), then the user is asked whether they wish to download the update in step 805. Note that the user is within the application that is to provide the functionality when asked whether they desire the update. If the user desires the update (step 806), then the mobile device 100 sends a request to the application marketplace 240 for the update in step 808. The application marketplace 240 may handle the request for the update in a similar manner as the performed in process 600. If the user does not desire the update, then the already installed code may be executed (step 308, FIG. 3).

In some embodiments, the mobile device 100 is notified by the application marketplace 240 that one or more updates are available without any specific request from the mobile device 100. These updates may be for code that was already downloaded from the application marketplace 240. For example, the notifications may be for further updates to core UI updates 255 that were previously downloaded. However, it is not required that the mobile device previously downloaded a core UI update 255 to receive a notification that a newer version of the update 255 is now available.

Figure 9:
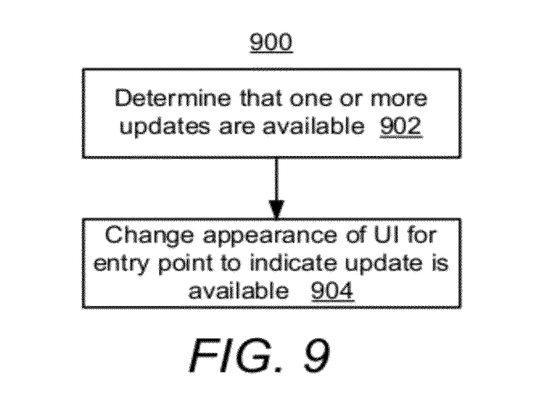
FIG. 9 is a flowchart of one embodiment of a process of conveying to the user through the user interface that updates are available.

In one embodiment, when updates are available, the mobile device 100 conveys this information to the user via the user interface. FIG. 9 is a flowchart of one embodiment of a process 900 of conveying to the user through the user interface that updates are available. Process 900 is one embodiment of step 302 of FIG. 3. In step 902, the mobile device 100 determines that updates are available for functionalities associated with entry points 402. In one embodiment, the mobile device 100 receives one or more notifications from the application marketplace 240 that updates are available for functionalities associated with entry points 402. In one embodiment, the mobile device 100 sends a query to the application marketplace 240 asking whether updates are available for functionalities associated with entry points 402.

In step 904, the mobile device 100 alters the appearance of the user interface in such a way to convey to the user that updates to the code for providing the functionality are available. For example, a message could be displayed that states that updates are available for the code that allows customization of the user's avatar. Note that these messages can be tailored to the specific functionality. For example, instead of presenting a generic message that updates are available, the mobile device 100 may display different messages for the functionality of each entry point. Also note that the messages are not necessarily displayed as soon as the notifications are received or at the same time. For example, the message that updates are available for customizing the avatar might only be presented once the user executes the game application that contains the entry point 402 for customizing the avatar. However, it is not required that the application that contains the entry point 402 be running in order to display the message that new code is available.

Figure 10:
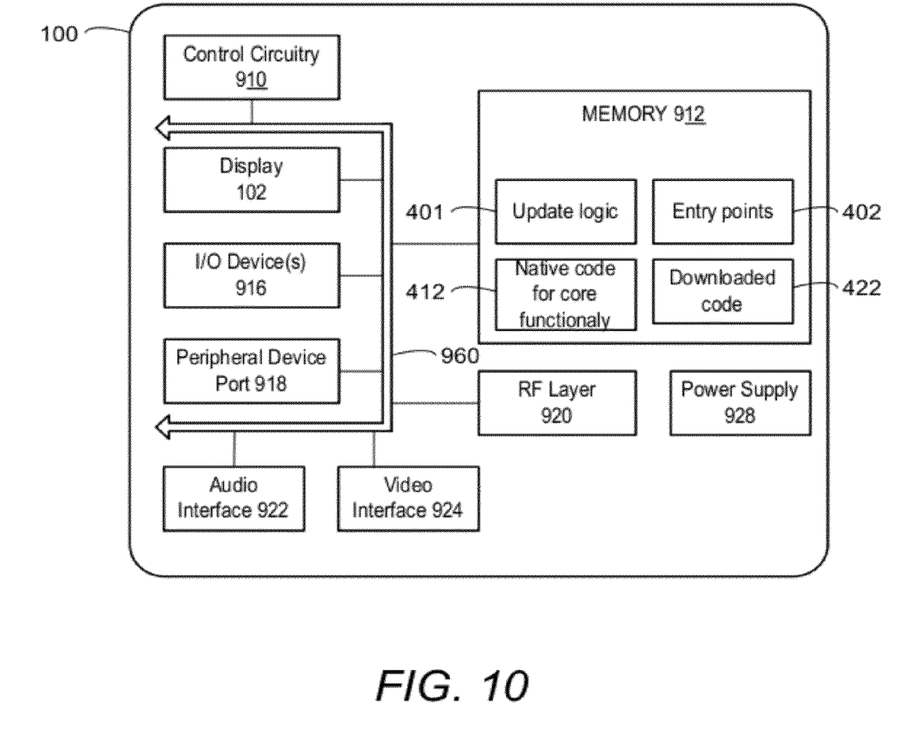
FIG. 10 is a block diagram of one example of a mobile device that can be used to implement embodiments of the disclosed technology.

FIG. 10 is a block diagram of one example of a mobile device 100 that can be used to implement embodiments of the disclosed technology. Exemplary electronic circuitry of a typical cell phone is depicted with a contact notes system for intelligently managing, recording, and displaying contact information during telephone calls. Mobile device 100 can be used in implementing a phone such as a smart phone or other device that can run one or more applications such as, for example, browser, email, scheduling, instant messaging, and media player applications. Mobile device 100 can execute an Operating System (OS) such as, WINDOWS XP®, WINDOWS MOBILE 2003®, Microsoft Windows Mobile 6.X, Microsoft Phone 7 Series, or WINDOWS CE®. available from MICROSOFT CORPORATION, REDMOND, Wash. In some embodiments, system 100 is integrated as a computing device, such as an integrated personal digital assistant (PDA) and wireless phone. Although specific components and software modules are depicted, it will be apparent that numerous physical and software based configurations may be employed while remaining within the spirit of the present disclosure. Generally, software and program modules as described herein include routines, programs, components, data structures, and other types of structures that perform particular tasks or implement particular abstract data types. Hardware or combinations of hardware and software can be substituted for software modules as described herein.

System 100 includes control circuitry 910, memory 912, display 102 and I/O device(2) 916 connected to one or more data buses 960. A peripheral device port 918 is provided for connecting to various peripherals. The control circuitry 910 includes one or more microprocessors. Memory 912 typically includes both non-volatile memory such as ROM and volatile memory such as RAM. Memory 912 stores processor-readable code which is executed by one or more processors of the control circuitry 910 to implement various functionality described herein. I/O device(s) 916 may include any number of input/output devices, such as a rollerball, push button numeric dialing pad (such as on a typical telephone), multi-key keyboard (such as a conventional keyboard). In one example, a separate I/O device may not be included in the mobile computing device such as where a touch screen or stylus is used. Display 102 may be a liquid crystal display, or any other type of display commonly used in mobile computing devices. Display 102 may be touch-sensitive, and would then also act as an input device. Power supply 928, which can include one or more batteries and/or an external power source, powers the various components of the mobile device.

The control circuitry further communicates with audio interface 922 and video interface 924. Audio interface 922 may be used with a speaker to provide audible signals to a user and a microphone to receive audible signals from the user, such as to facilitate a telephone conversation. Video interface 924 enables operation of an on-board camera to record still images, video streams, and the like, and further enables video for display 102.

System 900 may includes an operating system, which may execute on control circuitry 910. One or more applications may be loaded into memory 912 and run on or outside of operating system. Examples of application programs include phone dialer programs, e-mail programs, PIM (personal information management) programs, word processing programs, spreadsheet programs, Internet browser programs, and so forth. Applications may use and store information in non-volatile storage, such as e-mail or other messages used by an e-mail application, contact information used by a PIM, documents used by a word processing application, and the like.

The update logic 410, entry points 402, native code for core functionality 412 and downloaded code 422 may reside in the memory 912 and be executed control circuitry 910.

The control circuitry 910 communicates with radio frequency (RF) layer 920 which in turn is coupled to an antenna (not shown) to transmit and receive radio frequency communications. The control circuitry 910 controls transmission and reception of wireless signals. During a transmission mode, the control circuitry 910 provides a voice signal from a microphone, or other data signal, to the transmit/receive circuitry of the RF layer 920. The transmit/receive circuitry transmits the signal to a remote station (e.g., a fixed station, operator, other cellular phones, etc.) for communication through the antenna. Ringers, vibrators (not shown) and the like can be used to signal an incoming call, text message, calendar reminder, alarm clock reminder, or other notification to the user. Transmissions to and from the RF layer 920 can be conducted under control of the operating system 940. Communications received by the RF layer may be disseminated to applications 942 via the operating system 940, and vice versa. During a receiving mode, the transmit/receive circuitry receives a voice or other data signal from a remote station through the antenna. A received voice signal is provided to the speaker while other received data signals are also processed appropriately.

A mobile computing device implementing system 900 may have additional features or functionality. For example, the device may also include additional data storage devices (removable and/or non-removable) such as, magnetic disks, optical disks, or tape.

Figure 11:
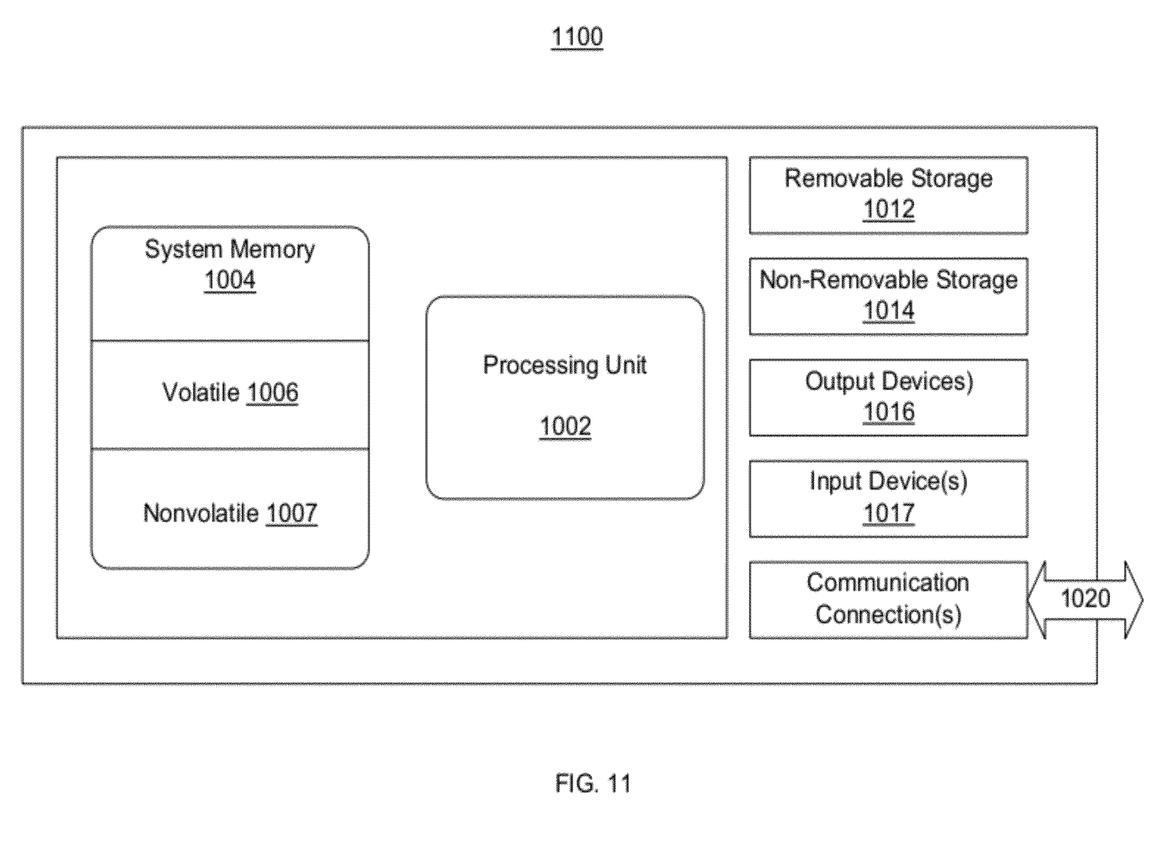
FIG. 11 is a block diagram of a computing system that can be used to implement components and perform methods of the disclosed technology.

With reference to FIG. 11, an exemplary system for implementing the various components of the described system and method may include a general purpose computing device in the form of a computer 1010. Computing device may be used to implement all or a portion of mobile device 100, computer 212, server 210, communications operator 202, application marketplace 240, for example. The computing device 1010 is only one example of a suitable computing system and is not intended to suggest any limitation as to the scope of use or functionality of the presently disclosed subject matter. Neither should the computing device be interpreted as having any dependency or requirement relating to any one or combination of components illustrated in the exemplary operating system. In some embodiments the various depicted computing elements may include circuitry configured to instantiate specific aspects of the present disclosure. For example, the term circuitry used in the disclosure can include specialized hardware components configured to perform function(s) by firmware or switches. In other examples embodiments the term circuitry can include a general purpose processing unit, memory, etc., configured by software instructions that embody logic operable to perform function(s). In example embodiments where circuitry includes a combination of hardware and software, an implementer may write source code embodying logic and the source code can be compiled into machine readable code that can be processed by the general purpose processing unit. Since one skilled in the art can appreciate that the state of the art has evolved to a point where there is little difference between hardware, software, or a combination of hardware/software, the selection of hardware versus software to effectuate specific functions is a design choice left to an implementer. More specifically, one of skill in the art can appreciate that a software process can be transformed into an equivalent hardware structure, and a hardware structure can itself be transformed into an equivalent software process. Thus, the selection of a hardware implementation versus a software implementation is one of design choice and left to the implementer.

In its most basic configuration, the computer 1000 typically includes a processing unit 1002 and memory 1004. Pending on the exact configuration and type of computing device, memory 1004 may be volatile (such as RAM), non-volatile (such as ROM, flash memory, etc.) or some combination of the two. Additionally, computer 1000 may also have mass storage (removable 1012 and/or non-removable 1014) such as magnetic or optical disks or tape.

Similarly, computer 1000 may also have input devices 1017 and/or output devices 1016. Other aspects of device 1000 may include communication connections 1020 to other devices, computers, networks, servers, etc. using either wired or wireless media.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. It is intended that the scope of the invention be defined by the claims appended hereto.

We claim:

1. A machine-implemented method comprising:
providing a user interface in a mobile device for selecting a plurality of functionalities associated with a plurality of entry points for launching the plurality of functionalities, each of the entry points includes an identifier that is associated with the code that provides the functionality for the entry point receiving a user request for a first functionality of the plurality of functionalities associated with a first of the entry points;

determining that code that provides the first functionality is not available on the mobile device;

sending a request for the code to an application marketplace in response to determining that the code is not available on the mobile device, the application marketplace serves third party applications for mobile devices;

installing the code on the mobile device in response to the request for the code being granted, the installed code is also for providing a second of the functionalities associated with a second of the entry points; and sending a parameter to the installed code that indicates that the first entry point was selected.

2. The machine-implemented method of claim 1, wherein the code is for a discrete piece of core user interface functionality of the mobile device.

3. The method claim 1, further comprising performing a failover operation that includes accessing a web page to provide a third functionality of the plurality of functionalities.

4. The method of claim 3, wherein the performing a failover operation further includes a server hosting the web page determining that a download of code for the third functionality from the application marketplace should be performed and re-directing the mobile device to the application marketplace.

5. The method claim 1, further comprising determining whether the code is available from the application marketplace at a later point in time if the code is not available from the application marketplace when the user requests the first functionality.

6. The method claim 1, further comprising automatically determining whether updates are available for the code that provides the first functionality.

7. The machine-implemented method of claim 1, wherein sending the request includes sending the identifier to the application marketplace.

8. The machine-implemented method of claim 1, wherein the application marketplace is a service that allows users to browse and download third party software applications.

9. The machine-implemented method of claim 1, further comprising the mobile device sending information to the application marketplace to purchase the code that provides the first functionality.

10. A mobile device, comprising:

one or more processors;

a network interface for exchanging information over one or more networks; and one or more storage devices in communication with the network interface and the one or more processors, the one or more storage devices store instructions, the one or more processors execute the instructions to:

provide a user interface for selecting a plurality of functionalities associated with a plurality of entry points for launching the functionalities, each of the entry points includes an identifier;

receive a user selection of a first of the functionalities associated with a first of the entry points;

determine that software code for providing the first functionality is not available on the mobile device;

send a request to an application marketplace that serves third party applications for the mobile device in response to determining the code for providing the first functionality is not already available on the mobile device, the request includes the identifier included in the first entry point;

install code for providing the first functionality on the mobile device in response to the request being satisfied, the installed code is also for providing a second of the functionalities associated with a second of the entry points; and send a parameter to the installed code that indicates that the first entry point was selected.

11. The mobile device of claim 10, further comprising instructions to perform a failover operation to access a web page to provide a third functionality of the plurality of functionalities.

12. The mobile device of claim 10, wherein the instructions further cause the processor to determine whether the code is available at the application marketplace at a later point in time if the code is not available at the application marketplace when the user requests the first functionality.

13. The mobile device of claim 10, wherein the instructions further cause the processor to automatically determine whether updates are available for the code for the first functionality.

14. The mobile device of claim 13, wherein the instructions that cause the processor to provide a user interface further include instructions that cause the processor to display a message that an update is available for the first functionality, the message is displayed within an application that provides the first functionality.

15. A computer readable storage device having stored thereon processor executable code which when executed on a processor causes the processor to:

provide a user interface in a mobile device for selecting a plurality of functionalities associated with a plurality of entry points for launching the plurality of functionalities, each of the entry points includes an identifier that is associated with the code that provides the functionality for the entry point receive a user request for a first functionality of the plurality of functionalities associated with a first of the entry points;

determine that code that provides the first functionality is not available on the mobile device;

send a request for the code that provides the first functionality to an application marketplace in response to determining that the code is not available on the mobile device, the application marketplace serves third party applications for mobile devices;

install the code on the mobile device in response to the request for the code being granted, the installed code is also for providing a second of the functionalities associated with a second of the entry points; and send a parameter to the installed code that indicates that the first entry point was selected.

16. The computer readable storage device of claim 15, wherein the instructions that cause the processor to send the request cause the processor to send the identifier.

* * * * *